United States Patent [19]
Killinger

[11] Patent Number: 5,364,220
[45] Date of Patent: Nov. 15, 1994

[54] SHELF SERVICING APPARATUS

[75] Inventor: Erich Killinger, Gaggenau, Germany

[73] Assignee: DAMBACH-Industrieanlagen GmbH, Gaggenau, Germany

[21] Appl. No.: 16,921

[22] Filed: Feb. 12, 1993

[30] Foreign Application Priority Data

Feb. 19, 1992 [DE] Germany .................... 4205001

[51] Int. Cl.⁵ .............................................. B65G 1/04
[52] U.S. Cl. ................................... 414/272; 414/278
[58] Field of Search ............... 414/272, 277, 278, 679,
414/233, 234, 235, 236, 237, 238, 239

[56] References Cited

U.S. PATENT DOCUMENTS

| | | | |
|---|---|---|---|
| 1,288,116 | 12/1918 | Moore | 414/278 X |
| 4,715,766 | 12/1987 | Gebhardt | 414/278 X |
| 4,838,749 | 6/1989 | Potocjnak | 414/277 |
| 4,887,953 | 12/1989 | Greub | 414/277 X |
| 5,149,240 | 9/1992 | DiRosa | 414/277 |

FOREIGN PATENT DOCUMENTS 1111085  7/1961  Germany ..................... 414/277

Primary Examiner—Cheryl L. Gastineau
Attorney, Agent, or Firm—Antonelli, Terry, Stout & Kraus

[57] ABSTRACT

A shelf servicing apparatus for a shelf store including a cabin adapted to be vertically movable along the apparatus and including a loading mechanism for placing containers in or removing containers from shelf locations of the shelf store. The cabin includes several positioning locations for containers to be placed in or removed from the store and, in order to enable a placement in or removal from the store. In order to enable a placement in or removal from a store of a large number of containers in a rapid and inexpensive manner, a conveying mechanism is located in a cabin by which the containers can be transferred to or removed from the loading mechanism and by which the containers in the cabin can be transferred from one positioning location to another. Preferably, the conveying mechanism is formed by at least one conveyor belt which, in turn, forms positioning locations.

24 Claims, 8 Drawing Sheets

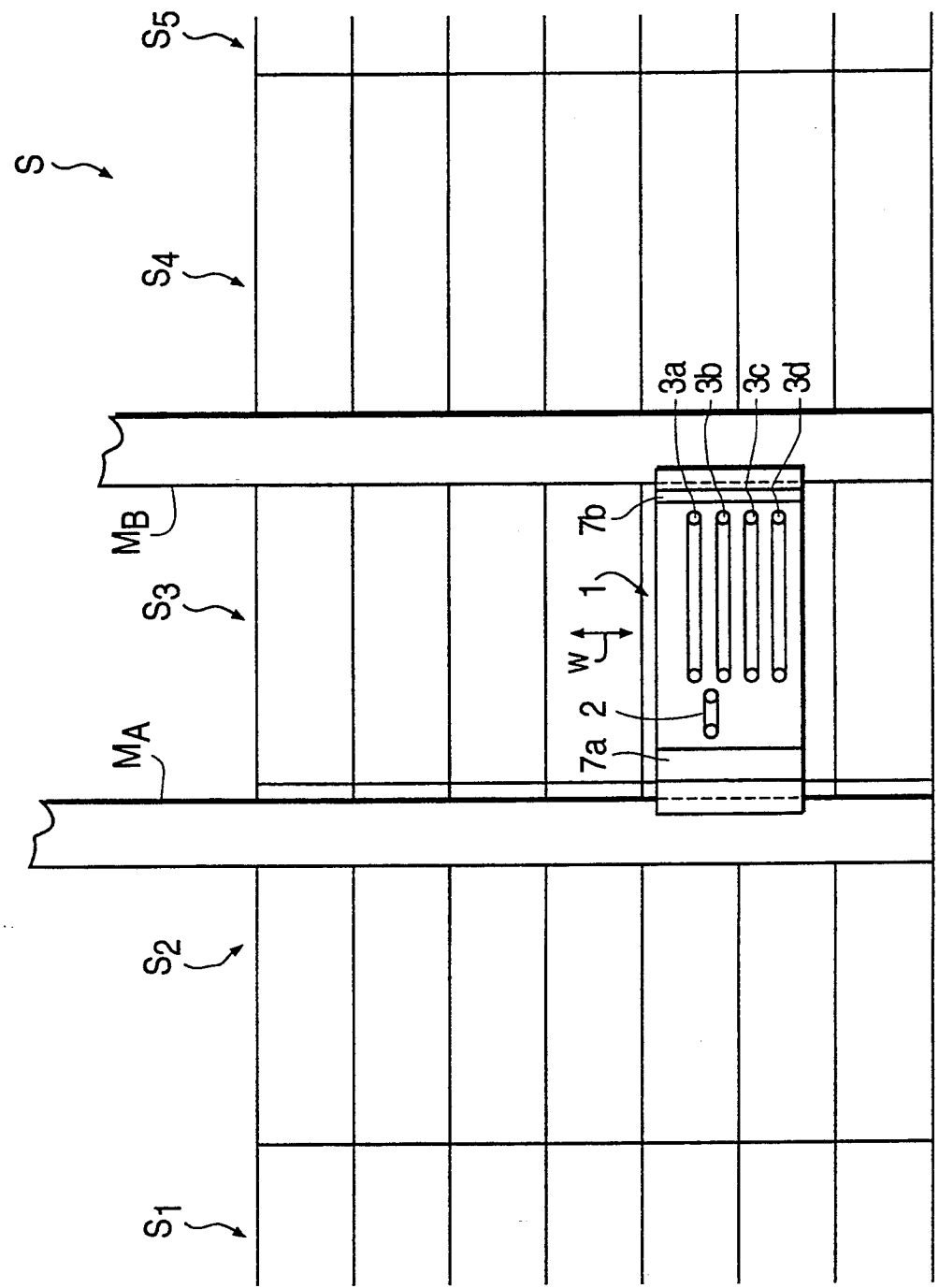

SHELF SERVICING APPARATUS

FIELD OF THE INVENTION

The invention relates to a shelf servicing apparatus for shelf stores with a cabin vertically movable along the same and which has a loading mechanism for placing containers in and removing them from shelf locations of the shelf store, and with the cabin containing a conveying mechanism with several positioning locations for the containers to be placed in or removed from the store, by which the containers can be transferred within the cabin from one positioning location to another.

BACKGROUND OF THE INVENTION

A shelf servicing apparatus is used for placing in and removing from a shelf store substantially random goods, the goods frequently being combined to form large units, for example in containers or cartons, on pallets, rack-boards, etc. In order to e.g. remove a container from a specific shelf compartment, the guided shelf servicing apparatus is moved into a shelf passage formed between the shelves. In order to obtain access to the desired shelf compartment, there is a cabin which is vertically movable on a mast and which is moved to the height of the desired shelf compartment. In this position and by loading mechanism fitted to the cabin and which can, for example be a fork telescope or a rotary sliding table, a container can be removed from the shelf compartment and transferred into the cabin. The container can then be moved with the shelf surfacing apparatus to a transfer station located at the shelf passage end or in the shelf prearea, where the container is removed from the cabin and is then transported on or partially or entirely emptied. As in this way only one container can be moved per shelf journey, for example placed in or removed from the store, such a procedure can only be performed economically in the case of large containers.

In order to obtain a more economic transportation and storage operation for smaller containers, it is possible to work with a manned cabin, the operator being able to manually remove several containers from different, successively moved up to shelf compartments and place same at positioning locations in the cabin or transfer containers set down in the cabin to specific shelf locations. After the desired number of containers has been removed from the shelf store, the shelf servicing apparatus is moved to the transfer station, where the containers are manually delivered by the operator or transferred for further transportation. Such a procedure is limited to relatively small, easily handlable containers and is consequently relatively time-intensive and expensive due to the considerable proportion of manual activity.

DE 91 03 197 U1 discloses a shelf servicing apparatus with a vertically movable lifting platform, which is provided with a loading mechanism, by which containers can be stored in or removed from shelf locations. The lifting platform has a revolving conveying mechanism, which comprises several positioning locations for containers to be placed in or removed from the store. During the movement of the conveying mechanism the containers located on the positioning locations are displaced relative to the lifting platform. However, the lifting platform capacity is very limited.

SUMMARY OF THE INVENTION

The aim underlying the invention essentially resides in providing a shelf servicing apparatus of the aforementioned type, which makes it possible in a rapid, inexpensive manner to place in and remove from the store a large number of containers and the like.

According to the invention, in the conveying mechanism has at least two superimposed horizontal conveyors by which the containers can be transferred to and removed from the loading mechanism vertically movable within the cabin.

As a result of the conveying mechanism located within the cabin in accordance with the present invention, it is possible to successively and automatically supply or remove from the loading mechanism a large number of containers, cartons, rack-boards or pallets. Thus, by the shelf servicing apparatus it is possible, in a single shelf journey, to have automatic access to numerous shelf compartments. After removing a container from a shelf compartment by the loading mechanism, the latter can be brought, with the aid of the conveying mechanism, to a positioning location in the cabin. In the meantime the shelf servicing apparatus can move up to a further shelf compartment and remove therefrom a container by the loading mechanism. A corresponding procedure is also possible when placing containers in store. Thus, as no manual work is required during the placing or removing from store of the containers, there is no need for an operator in the cabin, which leads to a more economic operation. The transloading of the containers within the cabin, as well as their placing in or removal from the store can take place simultaneously, so that there are short cycle times for container rearrangement purposes. Thus, the invention more particularly provides the possibility of bringing the containers together in the cabin in predetermined consignments, so that there is no need for the previously necessary rearrangement outside the shelf store and once again time can be saved. The placing and removing from store of containers can take place particularly economically if, during a shelf journey, containers are both placed in and removed from the store. In the simplest application form, all the containers in the cabin are stored in the shelf compartments, so that all the positioning locations of the cabin are free. Containers are then removed from the desired shelf compartments and placed on the positioning locations. For optimizing the movements of the shelf servicing apparatus, it is frequently necessary to carry out the placing and removal from store of containers in an irregular sequence. In order to be able to ensure a rapid and advantageous transloading of containers in the cabin, according to the invention, the containers are moved by the conveying mechanism from one positioning location to another. Thus, for example containers which are to be stored are always positioned close to the loading mechanism, whereas, those containers already removed from the store are located on positioning locations further removed from the loading mechanism. As the cycle times are also significantly co-determined by the shelf servicing apparatus travel time, in the case of the shelf servicing apparatus, according to the invention, by the conveying mechanism it is possible to rearrange the containers in the cabin at the same time as the shelf servicing apparatus is moving up to the next shelf compartment.

A constructionally simple design of the conveying mechanism can be obtained if it has the positioning locations and is formed by at least two superimposed horizontal conveyors. By the horizontal conveyors, it is possible to simultaneously deliver containers to the loading mechanism and also to bring other containers located on the horizontal conveyor closer to the loading mechanism by in each case, one positioning location, so that a simultaneous movement of several containers is possible. Through the provision of several horizontal conveyors they are either simultaneously or, as desired, couplable to the loading mechanism in such a way that one container can be transferred to the loading mechanism or can be removed therefrom.

A high capacity, while simultaneously only having a limited space requirement, can be obtained in that several horizontal conveyors are superimposed and optionally additionally juxtaposed. The horizontal conveyors can, for example, be driven roller conveyors, but a particularly simple construction is obtained if the horizontal conveyors are conveyor belts.

In order to be able to have access, as required, to the containers of a desired horizontal conveyor in a simple manner, the loading mechanism is vertically movable within the cabin. The loading mechanism can be positioned at the end of the desired horizontal conveyor, so as to take up or deliver a container. This also leads to the further advantage that, by the loading mechanism, access can be obtained to several superimposed shelf compartments without having to move the cabin. Thus, the time necessary for container transloading is reduced.

Advantageously the horizontal conveyors move in the longitudinal direction of the shelf. This makes it possible to obtain a very good utilization of the relatively narrow space available in the shelf passage and, therefore, in the cabin and simultaneously horizontal conveyors of an adequate capacity are usable.

In order to be able to use each horizontal conveyor as a conveying mechanism with positioning locations both for placing containers in and removing them from store, preferably, the horizontal conveyors are drivable in opposite directions, so that the containers are movable in both longitudinal extension directions of the horizontal conveyors.

In order to obtain a simple and rapid transfer of a container from the horizontal conveyors to the loading mechanism or vice versa, the loading mechanism must be positioned directly at the horizontal conveyor end. Thus, the container can be delivered directly from the horizontal conveyors to the loading mechanism. It can be advantageous for the loading mechanism to be equipped with a horizontal conveyor.

At the start of a shelf journey the positioning locations in the cabin can be completely occupied with containers to be stored. For sequential reasons it may be appropriate and even necessary to firstly remove one container from a shelf compartment before it is possible to start the placing in store of containers. However, if all the positioning locations are occupied with containers to be stored, advantageously, according to the invention, at least one intermediate storage location is provided for the temporary removal of a container. The container to be initially removed from the store can consequently be briefly intermediately stored until a positioning location in the cabin becomes free. Preferably, the intermediate storage location is formed by a load reception table or is provided with such a table. A space-saving construction is obtained if the load reception table is located at the horizontal conveyor end opposite to the loading mechanism.

Such an arrangement also leads to the advantage that a container located on the horizontal conveyor can be delivered by the latter directly to the load reception table or can be removed from the latter. It is advantageous if the load reception table is also equipped with a horizontal conveyor acting in the transfer direction. However, it is also possible to position the load reception table at the loading mechanism end remote from the horizontal conveyors.

In order to permit a movement of containers between individual horizontal conveyors without having to use the loading mechanism, for this purpose, when several horizontal conveyors are juxtaposed and/or at different heights within the cabin, according to a preferred development of the invention, the load reception table is movable within the cabin between the superimposed and/or juxtaposed horizontal conveyors. In this way the load reception table with its intermediate storage location can, as desired, be positioned alongside each of the horizontal conveyors.

According to a preferred development of the invention, the intermediate storage location is constructed as a loading mechanism, so that the transloading capacity can be increased.

It is also possible to construct the intermediate storage location on a further horizontal conveyor. Preferably, the further horizontal conveyor is constructed for receiving several containers, for example, several intermediate storage locations. The intermediate storage locations of the further horizontal conveyor are free at the start of the shelf journey, so that for the case that initially one or more containers are to be removed from the shelf compartments, a sufficient number of positioning locations are available for the containers in the cabin. With respect to the space requirement, it is advantageous to position the further horizontal conveyor below or above the at least two horizontal conveyors.

The loading mechanism can preferably be in the form of a rotary sliding table or a telescopic table with a transverse sliding direction or conveyor belt, but other designs are also conceivable, for example, a fork telescope. In order to be able to remove or place containers in the shelf compartments, the loading mechanism has a gripper, which is constructed as a vacuum suction device for gripping a container or as a mechanical pulling and sliding device, so as to be able to slide the containers in or remove from by means of gripping behind.

After the container, located in the cabin at the start of the shelf journey, has been placed in the store and the desired container removed therefrom and positioned on the positioning locations of the cabin, the shelf servicing apparatus is moved out of the shelf passage into the front area of the shelf store to a transfer station into which the container from the cabin is delivered and containers to be placed in store are received in the cabin. This preferably takes place automatically by coupling to a stationary conveying mechanism. As the containers are relatively difficult to access within the cabin, according to an advantageous development of the invention, at the transfer station at the end of the shelf passage each horizontal conveyor is pivoted out of the shelf passage zone about a vertical axis. The vertical axis is positioned close to one of the ends of each horizontal conveyor, so that the opposite conveyor end is pivoted out of the cabin and, in this position, is accessible in simple manner or can be coupled to a stationary conveying mechanism. Advantageously, the horizontal conveyors are pivotable as a unit, so that with a simple structure, for example, the use of a single drive mechanism, a more rapid transloading of containers in the transfer station can be achieved. If the transfer station is located directly at the end of the shelf passage, then the pivot axis of the horizontal conveyors is located on the horizontal conveyor end close to the shelf store. This saves travel time, in that the shelf servicing apparatus only has to be moved sufficiently close to the shelf passage end to enable the horizontal conveyors to be pivoted out.

Alternatively to the pivotability of the horizontal conveyors, it is also possible for each horizontal conveyor to be movable in the transfer station parallel to the shelf passage zone. In this way the horizontal conveyors are freed from the cabin over the entire length thereof. It can also be appropriate to construct the horizontal conveyors as a unit.

Alternatively thereto, it is also possible to pivot or extend the horizontal conveyors independently of one another. If one or more horizontal conveyors are unoccupied at the end of the shelf journey, they can be moved or pivoted into their loading position, whereas the horizontal conveyors occupied with the containers to be removed from the store must initially be brought into their unloading position. In the case of independently pivotable or movable horizontal conveyors, this enables loading and unloading processes to take place simultaneously, which increases the transloading capacity.

In the pivoted or extended state, the horizontal conveyors can be coupled to the stationary conveying mechanism. A rapid conveying on the containers removed from store and the introduction of the new containers to be placed in store can be achieved if the stationary conveying mechanism is also formed by conveyor belts. According to a preferred development of the invention, with each cabin horizontal conveyor is associated a stationary conveyor belt, so as to permit a simultaneous unloading and loading of the cabin horizontal conveyors, so that the time necessary for the transloading of containers in the transfer station is minimized.

Alternatively to the pivoting or moving of the horizontal conveyors in the transfer station, it is possible to have a magazine in the cabin, with the magazine comprising the conveying mechanism, i.e. the horizontal conveyors and the positioning locations, which can be interchanged in the transfer station at the end of the shelf passage. Thus, at the end of a shelf journey, the magazine with the containers to be removed from store merely has to be removed from the cabin. Subsequently, a further magazine having the containers to be placed in store is introduced into the cabin, so that a new shelf journey can be performed. Cabin loading and unloading in the transfer station can consequently be performed more rapidly, so that the shelf journey cycle times can be increased. The magazine with the containers to be removed from store can, while the cabin with the further magazine is performing the next shelf journey, be unloaded, without influencing the transloading capacity of the cabin.

In order to bring about a good utilization of the space at the end of the shelf passage, preferably, according to the invention, the magazine can be removed from or introduced into the cabin by a telescopic mechanism and/or a roller conveyor substantially parallel to the shelf passage zone. Thus, the space present at the front face of the shelves can be very well utilized for loading and unloading.

So that loading and unloading of the cabin by the magazines can take place very rapidly, according to a preferred development of the invention, one magazine, for example, the magazine containing the containers to be removed from the store is, in the transfer station, removed from one side of the cabin, while simultaneously, a further magazine, for example a magazine having the containers to be stored, is introducible into the cabin on the opposite side. Thus, for cabin loading and unloading in the transfer station it is merely necessary to have the time required for the moving of a magazine out of or into the cabin. This leads to very rapid transloading.

Within the cabin several stacks of superimposed horizontal conveyers can be juxtaposed and each horizontal conveyer preferably extends in the shelf passage direction. In order to achieve a high transloading capacity with the large number of horizontal conveyers, according to the invention, at least two loading mechanisms are juxtaposed at right angles to the longitudinal direction of the shelf passage. One loading mechanism is provided for each of the superimposed horizontal conveyers.

According to preferred developments of the invention at least two loading mechanisms are controllable, as desired, synchronously for the placing in or removing from the store of containers two or more times deep, or alternatively they are independently controllable. In the synchronized operating mode simultaneously two or more containers arranged successively in the shelf compartment can be removed therefrom and can be supplied by means of the loading mechanisms to different horizontal conveyers. Correspondingly, the containers can be stored in at least a double depth in the shelf compartments. This makes it possible to double the capacity of the shelf compartments usable from one shelf passage. In the case of the independent operation of the loading mechanisms containers can be simultaneously placed in or removed from shelf compartments on opposite cabin sides, so that a high transloading capacity is reliably obtained. The loading mechanisms, can remove the containers or transfer the containers to different horizontal conveyors, so that the shelf servicing apparatus is very flexibly usable.

BRIEF DESCRIPTION OF THE DRAWINGS

The invention is described in greater detail hereinafter relative to non-limitative embodiments and with reference to the attached drawings, wherein:

FIG. 10 is a schematic view of a relationship between the shelving apparatus and the cabin with respect to each other in an arrangement constructed in accordance with the present invention.

DETAILED DESCRIPTION

Figure 1:
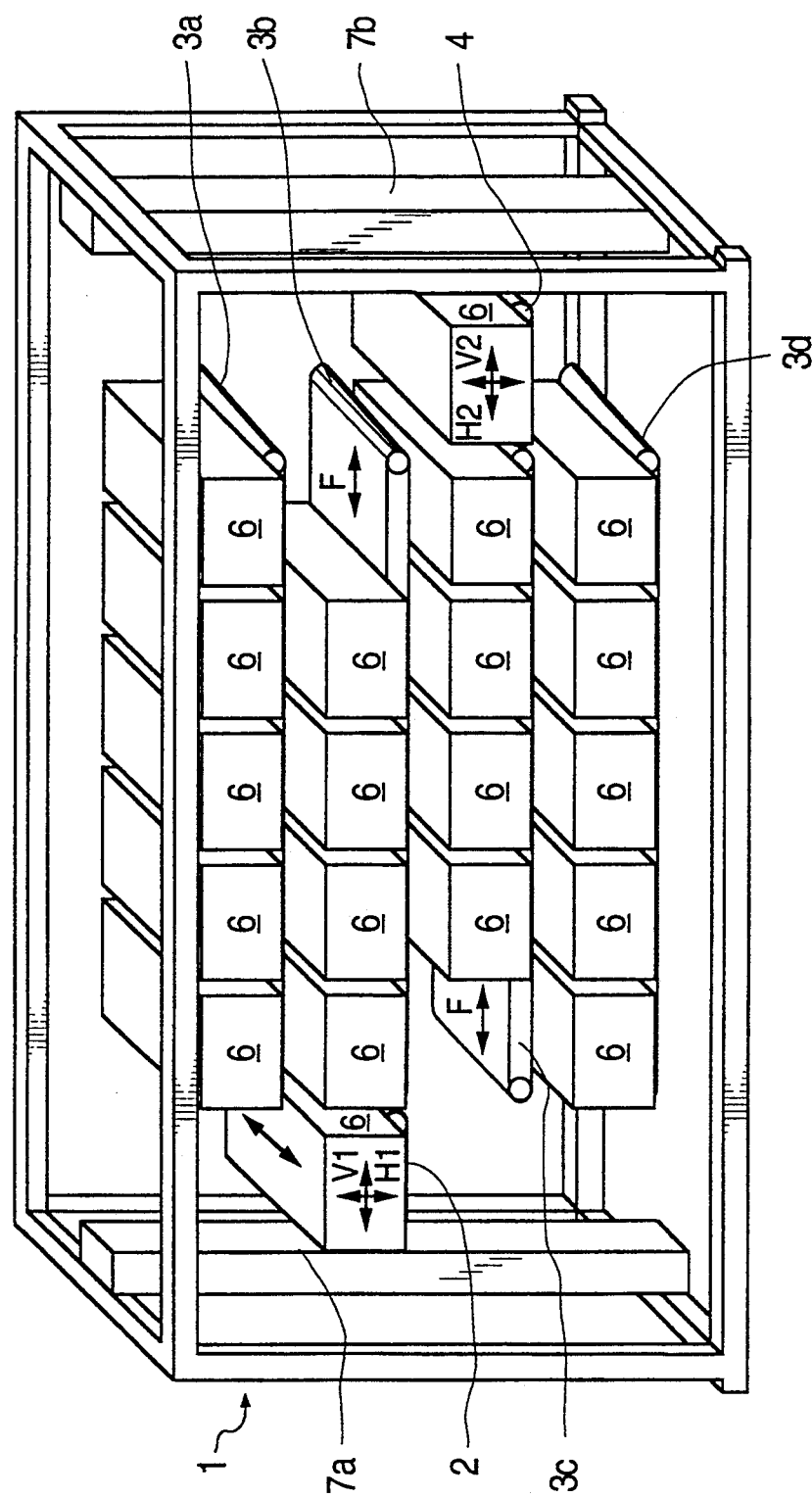
FIG. 1 is a perspective schematic view of a cabin constructed in accordance with the present invention.

Referring now to the drawings wherein like reference numerals are used throughout the various views to designate like parts and, more particularly, to FIGS. 1 and 10, according to these figures, a cabin generally designated by the reference numeral 1 is mounted so as to be vertically adjustable on masts $M_A$, $M_B$ (FIG. 10) of a shelf servicing apparatus generally designated by the reference character S (FIG. 10) and is adapted to be vertically moved along the same. The cabin 1 comprises a three-dimensional frame and is shaped like an open box or crate. Vertical masts 7A, 7B are arranged near to the respective end faces of the cabin 1 and respectively cooperate with the masts $M_A$, $M_B$, to enable adjustment in the direction of the double head arrow W in FIG. 10.

On the masts 7a to the left in FIG. 1 is mounted a loading mechanism in the form of a rotary sliding table 2, which is vertically movable on the mast 7 as indicated by the double arrow $V_1$. In addition, by the rotary sliding table 2, a container 6 can be transferred into or removed from a shelf compartment $S_1$, $S_2$, $S_3$, $S_4$, $S_5$, of a shelf store generally designated by the reference character S (FIG. 10), as indicated by the double headed arrow L in FIG. 1. The shelf store S is parallel to the drawing plane of FIG. 10 upstream and/or downstream of the 1. The rotary sliding table 2 would include a conveyor belt 2a (FIG. 2A), which is rotatable together with the rotary sliding table 2, so that a container 6 on the conveyor belt 2a is also movable in the direction of the double arrow $H_1$ in FIG. 1.

Figure 2A:
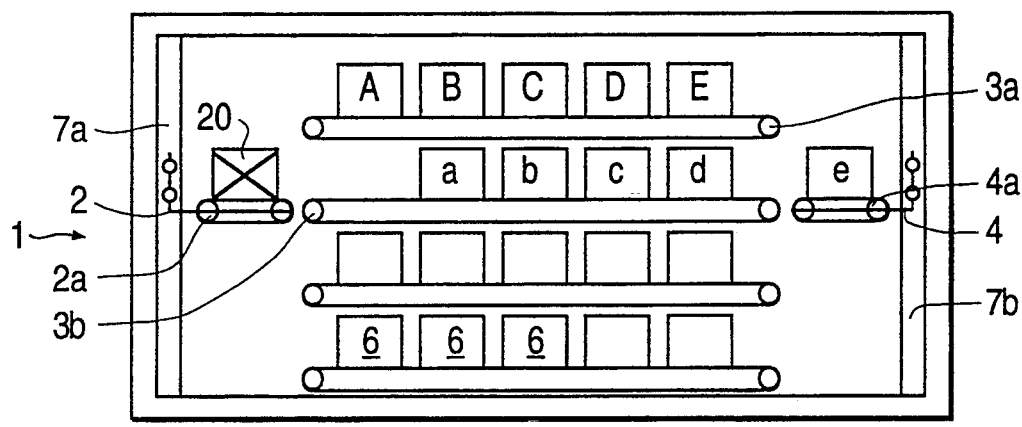
FIGS. 2A, 2B, 2C are schematic views of individual phases during the trans-loading of containers in the cabin of FIG. 1 in a first variant of the present invention.

On the mast 7b, located at the opposite end of the cabin 1, is a vertically movable load reception table 4, as indicated by the double arrow $V_2$. The load reception table 4 also has a conveyor belt 4a (FIG. 2A). The conveyor belt 4a extends in the cabin 1 in a longitudinal direction and in the shelf passage direction and permits a movement of the container 6 located thereon in the longitudinal direction, for example, in the direction of the double arrow $H_2$ (FIG. 1).

In the embodiment according to FIG. 1, between the rotary sliding table 2 and the load reception table 4 are superimposed four conveyor belts 3a, 3b, 3c, 3d, which, in each case, extend in the cabin longitudinal direction and form positioning locations 4, in each case, five containers 6, which are movable in the cabin longitudinal direction, as indicated by the double headed arrow F in FIG. 1.

Figure 2B:
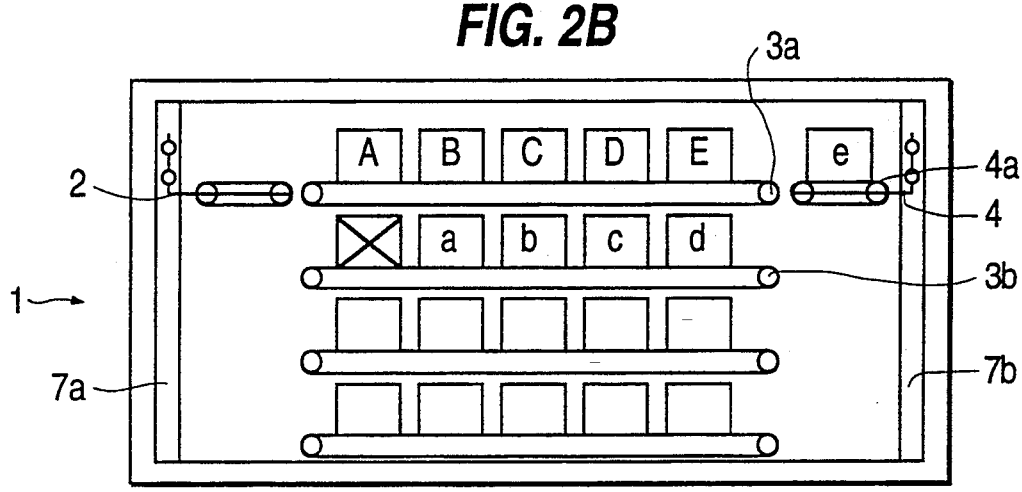
Figure 2C:
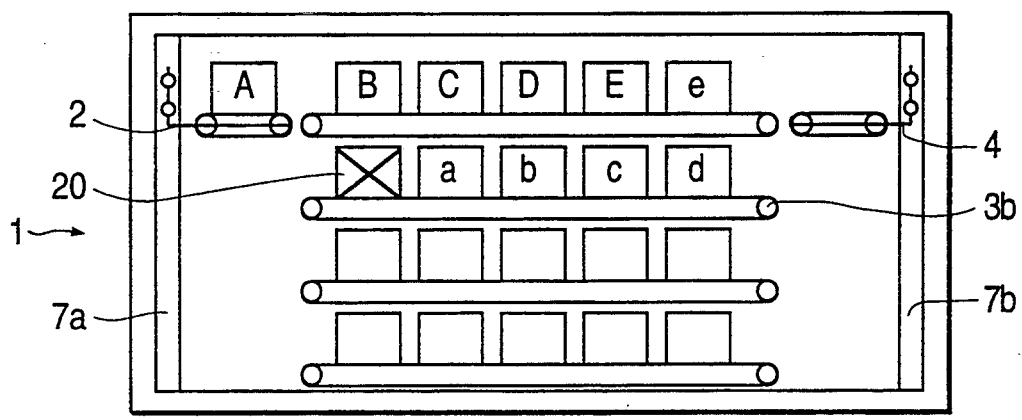

With reference to FIGS. 2A, 2B and 2C a possibility of the transloading of containers 6 will now be explained. At the start of the shelf journey the in each case five positioning locations of each conveyor belt 3a, 3b, 3c, 3d, are occupied with containers 6 previously taken up outside the shelf store and to be stored in the latter. There are no containers on the rotary sliding table 2 or on the load reception table 4.

In a first stage, the rotary sliding table 2 takes a container 20 to be removed from the store from a shelf compartment of the shelf store. The rotary sliding table 2 is moved on the mast 7a in such a way that it is positioned directly at the end of a specific conveyor belt and which, according to FIG. 2A, is the second conveyor belt 3b from the top of the cabin 1. The rotary sliding table 2 is then aligned in such a way that its conveyor belt 2a is oriented in the cabin longitudinal direction (FIG. 2A).

Simultaneously with the removal of the container 20 from the store, the load reception table 4 on the mast 7b moves to the level of the conveyor belt 3b. By activating the conveyor belt 3b all the containers located thereon and which are indicated in the drawing as a, b, c, d and e, are moved by one position to the right and the container e is delivered to the load reception table 4.

While the load reception table 4 with the container e is moved level with the upper conveyor belt 3a, the container 20 removed from the store is slid by the rotary sliding table 2 onto the positioning location of the second conveyor belt 3b which has become free. The empty rotary sliding table 2 now also moves to the level of the upper conveyor belt 3a (FIG. 2B). By activating the conveyor belt 3a and the conveyor belt 4a of the load reception table 4, all the containers A, B, C, D and E on the conveyor belt 3a and the container on the load reception table 4 can be moved to the left according to FIG. 2B. The container A passes onto the conveyor belt 2a of the rotary sliding table 2, while the container e on the load reception table 4 is slid onto the conveyor belt 3a (FIG. 2C).

Subsequently the container A is, in known manner, placed in a desired, not shown shelf compartment of the shelf store. In this state once again the, in each case five positioning locations of each conveyor belt 3a, 3b, 3c, 3d, are occupied with containers, but compared with the initial state one container A to be stored has been replaced by a container 20 to be removed from the store.

A corresponding transloading process is repeated twenty times in the represented embodiment, so that all the containers initially located on the conveyor belts 3a, 3b, 3c, 3d have been stored in corresponding shelf compartments, while twenty containers to be removed from the store are positioned on the positioning locations of the conveyor belts. In particular, the removal from store of the containers can take place in such a way that the containers are arranged in the cabin in a desired consignment.

Figure 6:
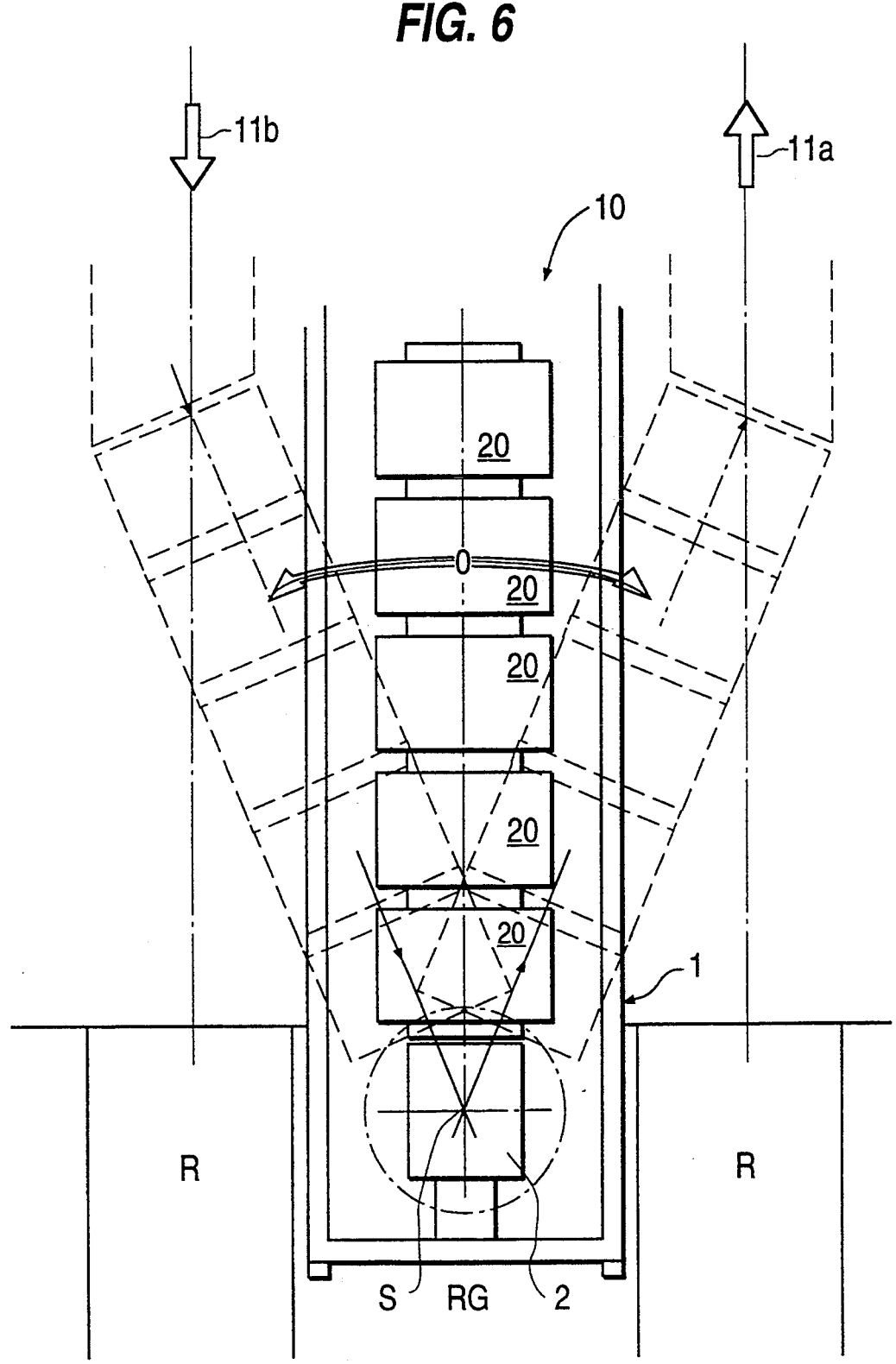
FIG. 6 is a plan view of a transfer station constructed in accordance with the present invention.

At the end of such a transloading the shelf servicing apparatus can be moved to a random delivery station, but in particular to a transfer station, as shown in FIG. 6.

For the purpose of the transfer of the container 20 to be removed from store, the shelf servicing apparatus or the cabin 1 shown in FIG. 6 leaves the shelf passage RG between the shelves R and moves at least partly into the forefield V, where there are stationary conveyer belts on both sides of the shelf passage RG and which are merely indicated in FIG. 6 by arrows 11a or 11b indicating the conveying direction thereof. After the cabin 1 has left the shelf passage RG, the conveyer belts 3a, 3b, 3c, 3d, are pivoted clockwise according to FIG. 6 about a vertical axis S positioned close to the rotary sliding table 2, so that the end of the conveyer belts 3a, 3b, 3c, 3d positioned close to the load reception table is pivoted out of the cabin 1. In this position shown in broken line form in FIG. 6 the conveyer belts 3a, 3b, 3c, 3d, can be coupled to the stationary conveyer belts 11a, so that all the containers 20 to be removed from store and located on the conveyer belts 3a, 3b, 3c, 3d can be removed from the cabin 1 by activating the conveyer belts 3a, 3b, 3c, 3d and the conveyer belts 11a.

After emptying the conveyer belts 3a, 3b, 3c, 3d, they are pivoted counterclockwise about the axis S until the end of the conveyer belts 3a, 3b, 3c, 3d close to the load reception table is pivoted out of the cabin 1 on the other side. In this position also shown in broken line form in FIG. 6 the conveyer belts 3a, 3b, 3c, 3d are couplable with the stationary conveyer belts 11b by means of which the new containers to be placed in store can be transferred to the conveyer belts 3a, 3b, 3c, 3d. The previously described transloading cycle is then started anew.

Figure 3A:
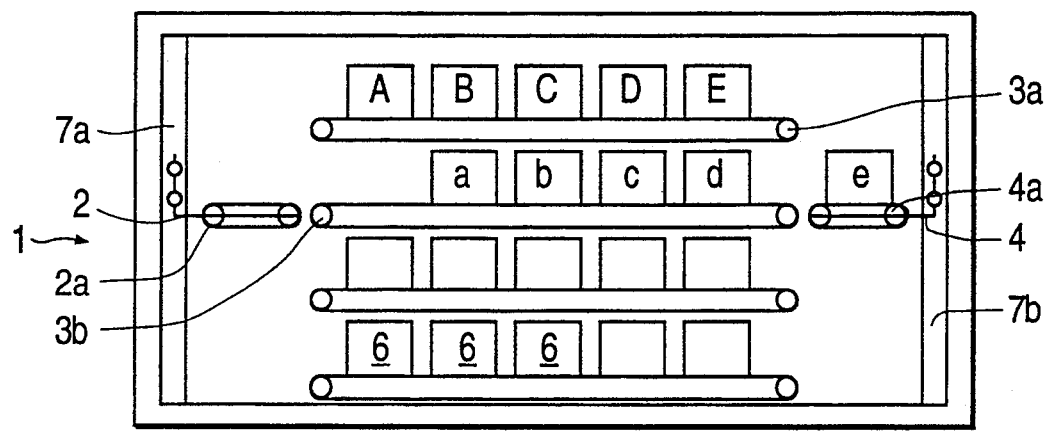
FIGS. 3A, 3B, 3C are schematic views of individual phases during the trans-loading of containers in the cabin of FIG. 1 in a second variant of the present invention.
Figure 3B:
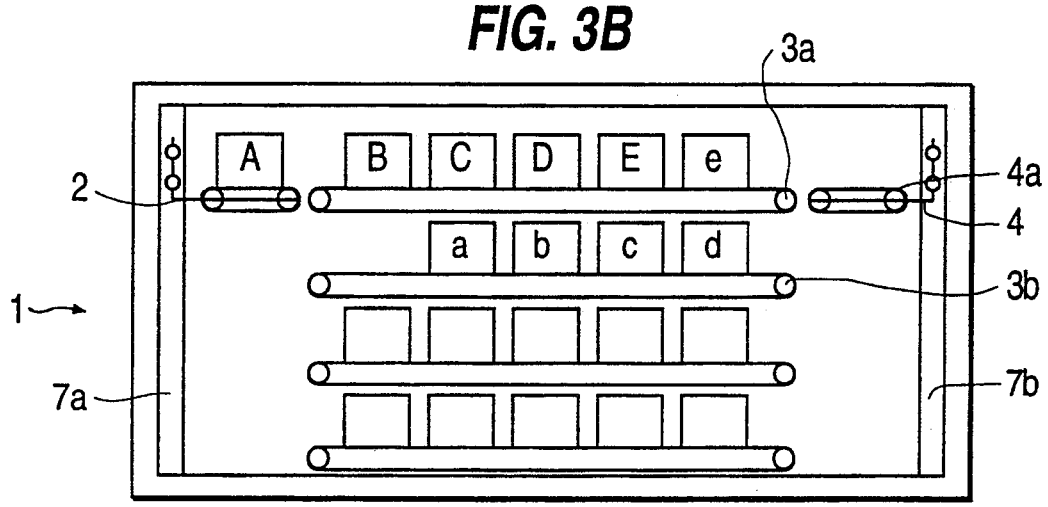
Figure 3C:
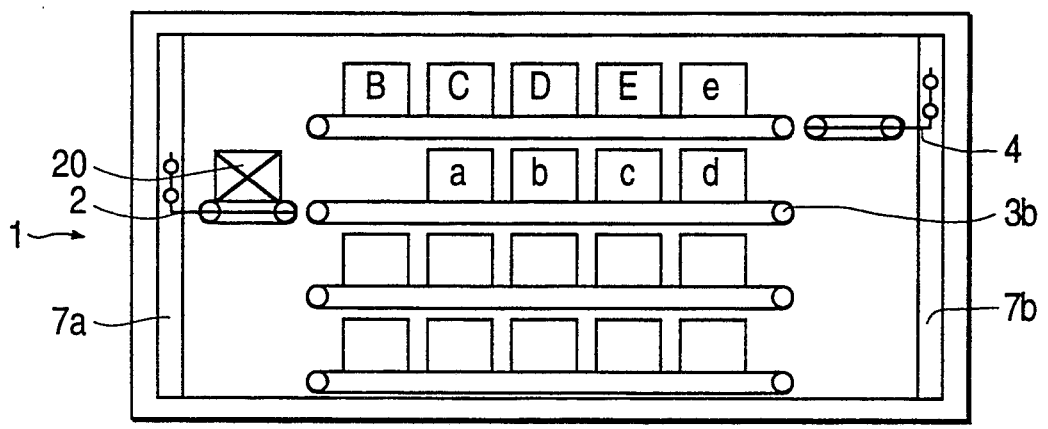

FIGS. 3A, 3B and 3C show a further variant for the transloading of containers in the cabin 1. As described in connection with FIGS. 2A, 2B and 2C at the start of the shelf journey the in each case five positioning locations of each conveyer belt 3a, b, c, d are occupied with containers 6 to be placed in store. No containers are located on the rotary sliding table 2 or the load reception table 4.

At the start of a storing cycle the load reception table 4 is moved level with a specific conveyor belt and according to FIG. 3A it is the conveyor belt 3b, so that it is positioned directly at the end of the latter. By activating the conveyor belt 3b and optionally the conveyor belt 4a of the load reception table 4 all the containers a,b,c,d,e located on the conveyor belt 3b are moved to the right, the container e coming to rest on the load reception table 4 (FIG. 3A). In the meantime the rotary sliding table 2 has been moved to the level of the upper conveyor belt 3a.

Subsequently, the load reception table 4 moves upwards on the mast 7b until it is located directly at the end of the upper conveyor belt 3a. By activating the conveyor belt 3a and the conveyor belt 4a of the load reception table 4 and optionally the conveyor belt 2a of the rotary sliding table 2 on the one hand all the containers A, B, C, D and E located on the upper conveyor belt 3a are moved by one position to the left, the container A passing onto the rotary sliding table 2, and on the other the container e is delivered from the load reception table 4 to the conveyor belt 3a (FIG. 3B). The container A can then, in a known manner, be placed in a specific shelf compartment by means of the rotary sliding table 2. Then a container 20 to be removed from the store is removed from the shelf compartment by the rotary sliding table 2 and placed on the positioning location of the conveyor belt 3b which has become free due to the transloading of the container e. In this state once again all the positioning locations of the conveyor belts 3a, 3b, 3c, 3d are occupied with containers, but the container A is stored in a shelf compartment and instead of the latter a container 20 to be removed from store is located on the conveyor belt. This storing and store removal cycle is repeated until all the containers to be stored are located in the predetermined shelf compartments and simultaneously the desired containers have been removed from the store. At the end of this process the shelf conveyor system can be moved to the transfer station located in the forefield of the shelf passage, in which the containers to be removed from store are delivered in the above-described manner and new containers to be stored are received.

Figure 4:
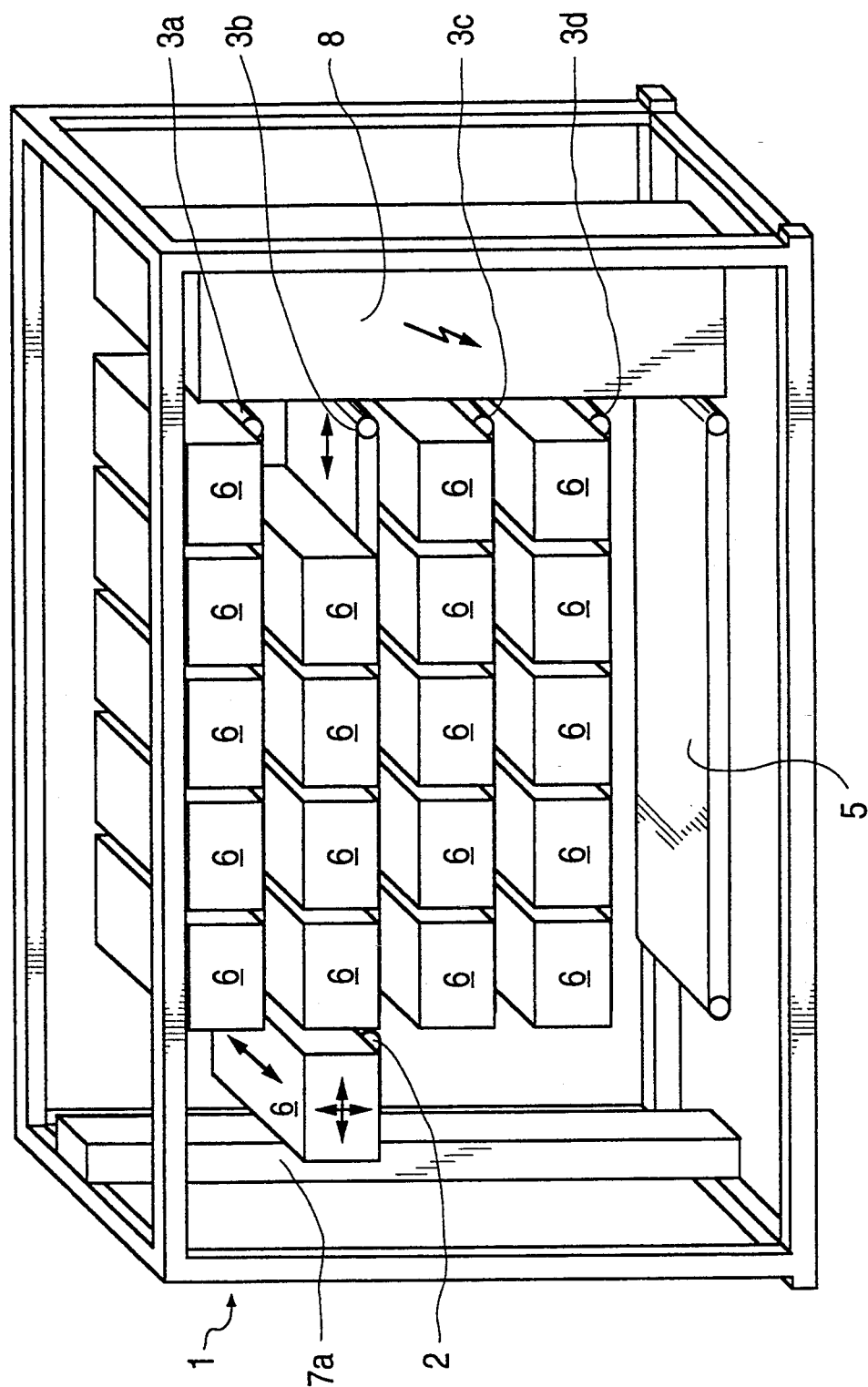
FIG. 4 is a schematic view of an alternative embodiment of a cabin constructed in accordance with the present invention.

FIG. 4 shows another embodiment of a cabin 1, which differs from that according to FIG. 1 by the arrangement of a further conveyor belt 5 below the conveyor belts 3a, 3b, 3c and 3d and which takes the place of the load reception table. FIG. 4 also shows a control panel or switch cabinet 8 with the components necessary for the control of the movement sequences. The further conveyor belt 5 is oriented in the cabin longitudinal direction corresponding to the conveyor belts 3a, 3b, 3c, 3d and the rotary sliding table 2 can, in addition to the movement possibilities according to FIG. 1, be lowered into a position directly at the end of the further conveyor belt 5.

Figure 5A:
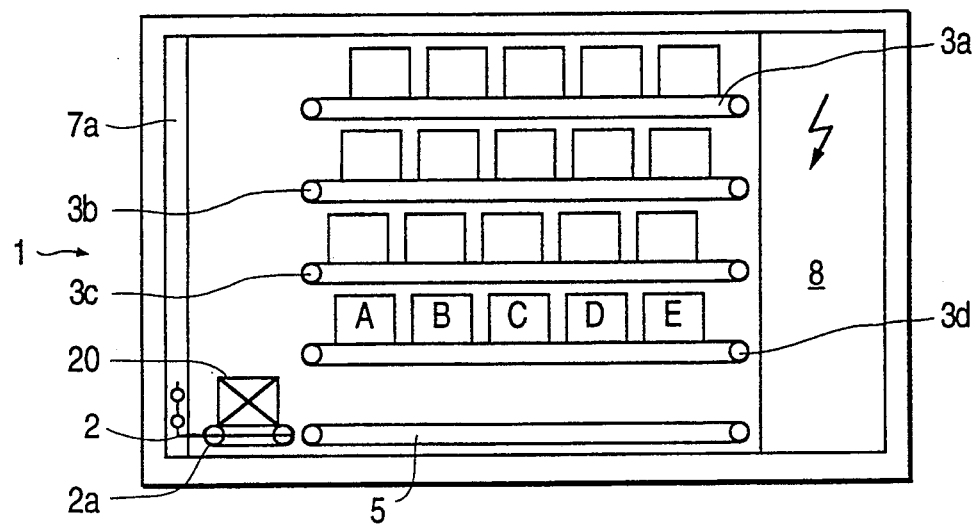
FIGS. 5A, 5B, 5C are schematic views of individual phases during the trans-loading of containers in the cabin of FIG. 4.
Figure 5B:
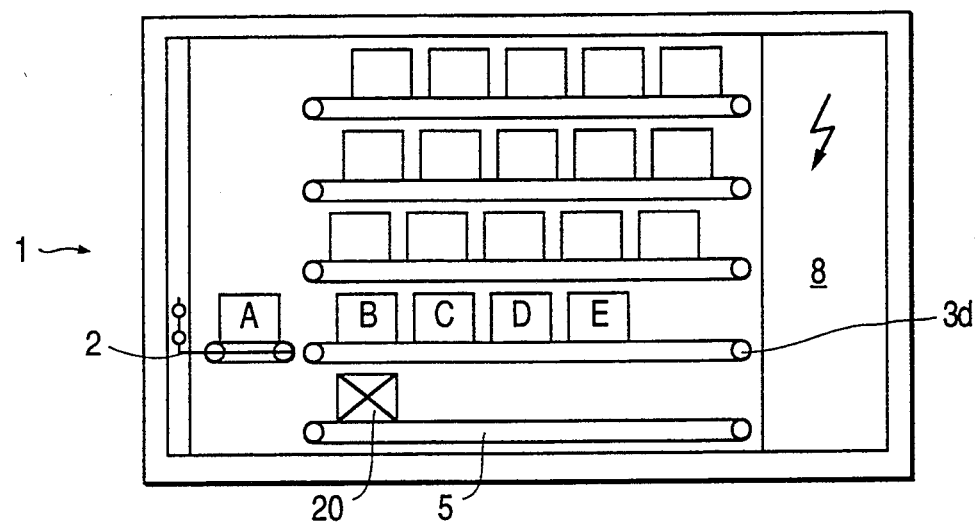
Figure 5C:
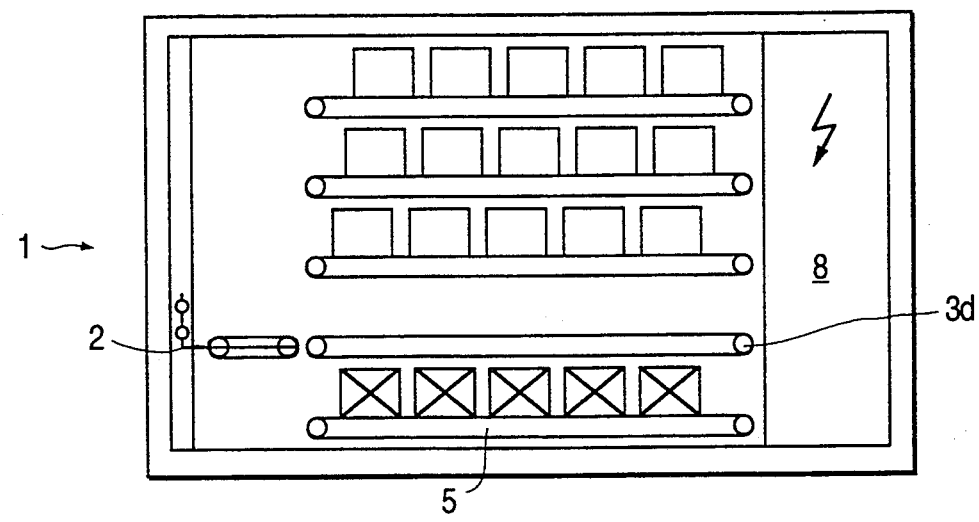

With reference to FIGS. 5A, 5B and 5C a variant of the container transloading with respect to a cabin according to FIG. 4 will be explained. Initially the conveyor belts 3a, 3b, 3c, are occupied with containers to be stored, whereas the lower, further conveyor belt 5 is free. After moving up to a predetermined shelf compartment with the cabin 1, optionally in conjunction with a raising or lowering movement of the rotary sliding table, by the rotary sliding table 2 a container 20 to be removed from store is removed of the shelf compartment and transferred to the further conveyor belt 5, which serves as an intermediate or buffer store. The rotary sliding table 2 then moves to the level of, for example the conveyor belt 3d and then by activating the conveyor belt 3b and optionally the conveyor belt 2a of the rotary sliding table 2 all the containers located on the conveyor belt 3d migrate to the left by one position and the container A passes onto to the rotary sliding table (FIG. 5B). The container A by the rotary sliding table 2 can then be placed in the same or a different empty shelf compartment. After removing a further container 20 from store, it is placed by activating the further conveyor belt 5 and the conveyor belt 2a of the rotary sliding table on the further conveyor belt 5 alongside the previously store-removed container 20. The container B to be stored is then taken up in the above-described manner from the rotary sliding table 2 and transferred into a shelf compartment. After performing this cycle five times the state shown in FIG. 5C is reached, in which the lower, further conveyor belt 5 is completely occupied with containers 20 to be removed from store, while the conveyor belt 3d is now empty, because all the containers A, B, C, D and E located on the conveyor belt 3d at the start of the shelf journey have been placed in store in the desired shelf compartments. On continuing the storing and store removal process, the containers to be removed from store are delivered onto the conveyor belt 3d, while simultaneously another conveyor belt is emptied by placing in store the container thereon. At the end of the storing and store removal process four of the five conveyor belts in the cabin 1 are occupied with containers 20 to be removed from the store, whereas, one conveyor belt is free of containers.

After moving the cabin 1 to the transfer station 10 located in the forefield of the shelf store, the containers to be removed from store are delivered in the above-described manner, while subsequently new, containers to be stored are transferred to the conveyor belts 3a, b, c, d and the lower conveyor belt 5 serving as a buffer store remains free. Obviously, any other conveyor belt can serve as a buffer store.

Figure 7:
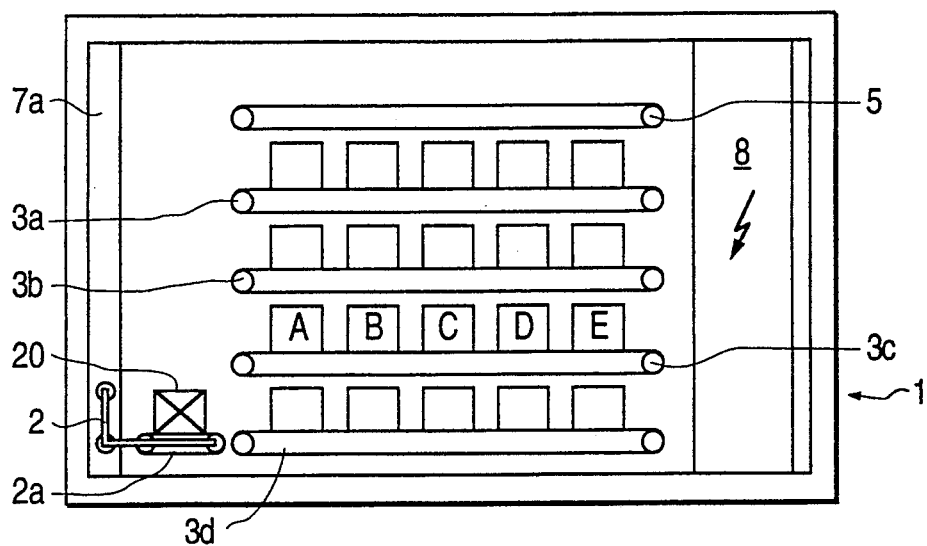
FIGS. 7, 8 and 9 are schematic views of another embodiment of individual trans-loading containers in the cabin of FIG. 4.
Figure 8:
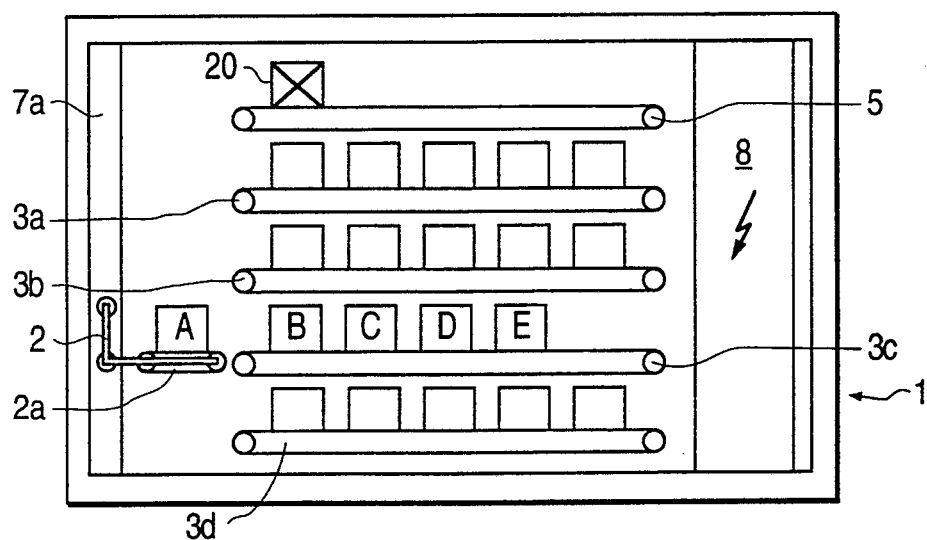
Figure 9:
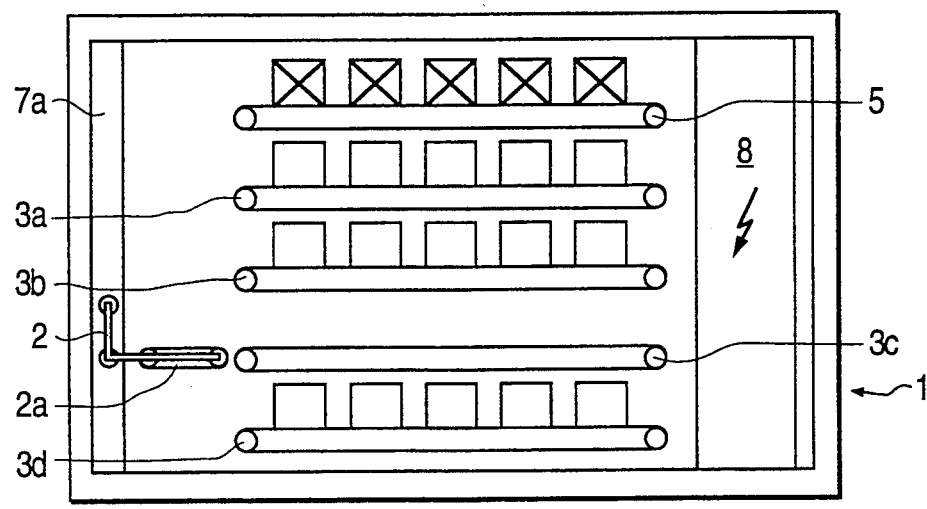

FIGS. 7, 8 and 9 schematically illustrate another variant of container trans-loading with respect to the cabin of FIG. 4, with the difference between the construction of FIGS. 7-9 and FIGS. 5A, 5B, 5C residing in the disposition of the further horizontal conveyor 5 above the conveyor belts 3a, 3b, 3c. In all other respects, the trans-loading device of FIGS. 7–9 functions in the manner described hereinabove in connection with FIGS. 5A, 5B, 5C.

I claim:

1. Shelf servicing apparatus for a shelf store including a cabin adapted to be vertically movable with respect to the shelf store, a loading mechanism for placing containers in or removing said containers from shelf locations of the shelf store, the cabin comprising a conveyor mechanism with a plurality of positioning locations for containers to be placed in or removed from said shelf store, whereby the containers in the cabin can be transferred from one positioning location to another, wherein the conveyor mechanism includes at least two superimposed horizontal conveyors for transferring the containers to or removed from the loading mechanism vertically movable within the cabin.

2. Shelf servicing apparatus according to claim 1, wherein the at least two superimposed horizontal conveyors run in a longitudinal direction of the shelf.

3. Shelf servicing apparatus according to claim 1, wherein the at least two superimposed horizontal conveyors are adapted to be driven in opposite directions.

4. Shelf servicing apparatus according to claim 1, wherein the loading mechanism is located directly at an end of the at least two superimposed horizontal conveyors.

5. Shelf servicing apparatus according to claim 1, wherein several horizontal conveyors are juxtaposed.

6. Shelf servicing apparatus according to claim 1, wherein said at least two superimposed horizontal conveyors include conveyor belts.

7. Shelf servicing apparatus according to claim 1, wherein at least one intermediate storage location is provided for temporary reception of a container.

8. Shelf servicing apparatus according to claim 7, wherein the intermediate storage location includes a load reception table.

9. Shelf servicing apparatus according to claim 8, wherein the load reception table is located at an end of the horizontal conveyors opposite to the loading mechanism.

10. Shelf servicing apparatus according to claim 8, wherein the load reception table is adapted to be moved within the cabin between the at least two superimposed horizontal conveyors.

11. Shelf servicing apparatus according to claim 8, wherein the intermediate storage location includes a loading mechanism.

12. Shelf servicing apparatus according to claim 7, wherein the intermediate storage location includes a further horizontal conveyor.

13. Shelf servicing apparatus according to claim 12, wherein the further horizontal conveyor is adapted to receive several containers.

14. Shelf servicing apparatus according to claim 12, wherein the further horizontal conveyor is positioned above or below the at least two superimposed horizontal conveyors.

15. Shelf servicing apparatus according to claim 1, wherein each of the at least two superimposed horizontal conveyors in a transfer station at an end of a shelf passage is adapted to be pivoted about a vertical axis out of a zone of the shelf passage.

16. Shelf servicing apparatus according to claim 1, wherein each of the at least two superimposed horizontal conveyors in a transfer station is adapted to be moved substantially parallel to a zone of a shelf passage.

17. Shelf servicing apparatus according to claim 15, wherein the at least two superimposed horizontal conveyors are one of pivotable or displaceable as a unit.

18. Shelf servicing apparatus according to claim 15, wherein the at least two superimposed horizontal conveyors are pivotable or displaceable independently of one another.

19. Shelf servicing apparatus according to claim 15, wherein the at least two superimposed horizontal conveyors in one of a pivoted or displaced state thereof are adapted to be coupled to a stationary conveying mechanism located outside the shelf store.

20. Shelf servicing apparatus according to claim 19, wherein the stationary conveying mechanism includes conveyor belts.

21. Shelf servicing apparatus according to claim 20, wherein a stationary conveyor belt is associated with each of the at least two horizontal conveyors of the cabin.

22. Shelf servicing apparatus according to claim 1, wherein at least two juxtaposed loading mechanisms positioned perpendicular to the longitudinal direction of the shelf store are provided.

23. Shelf servicing apparatus according to claim 22, wherein the at least two loading mechanism are one of synchronously or independently controllable for a left and right placing of containers in or removal of containers from the shelf store.

24. Shelf servicing apparatus according to claim 22, wherein at least one conveying mechanism is associated with each loading mechanism.

* * * * *